(12) United States Patent
Odhner et al.

(10) Patent No.: US 8,371,202 B2
(45) Date of Patent: Feb. 12, 2013

(54) METHOD AND APPARATUS FOR PROTECTING VEHICLES AND PERSONNEL AGAINST INCOMING PROJECTILES

(75) Inventors: Jefferson E. Odhner, Amherst, NH (US); John A. McNeil, Amherst, NH (US); Geoffrey P. McKinnon, Chelmsford, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 13/098,514

(22) Filed: May 2, 2011
(Under 37 CFR 1.47)

(65) Prior Publication Data

US 2011/0204145 A1      Aug. 25, 2011

Related U.S. Application Data

(62) Division of application No. 11/660,246, filed on Feb. 13, 2007, now Pat. No. 7,954,411.

(60) Provisional application No. 60/686,477, filed on Jun. 1, 2005.

(51) Int. Cl.
*B64D 1/04*     (2006.01)

(52) U.S. Cl. ........ 89/1.11; 89/36.17; 356/5.01; 235/400

(58) Field of Classification Search .................. 89/1.11, 89/36.17; 356/3.01–3.15, 4.01–4.1, 5.01, 356/28, 28.5
See application file for complete search history.

(56) References Cited

U.S. PATENT DOCUMENTS

| | | | |
|---|---|---|---|
| 3,487,226 A | 12/1969 | Yetter et al. | |
| 4,051,763 A | 10/1977 | Thomanek | |
| 5,321,490 A * | 6/1994 | Olson et al. | ................. 356/5.03 |
| 7,190,304 B1 | 3/2007 | Carlson | |
| 7,202,809 B1 | 4/2007 | Schade et al. | |
| 7,205,932 B2 | 4/2007 | Fiore | |
| 7,286,213 B2 | 10/2007 | Bredy | |
| 7,387,060 B1 | 6/2008 | Sanford | |
| 7,684,020 B1 | 3/2010 | Marti et al. | |
| 7,827,900 B2 | 11/2010 | Beach et al. | |
| 2008/0273190 A1 | 11/2008 | Smith | |
| 2009/0122298 A1 | 5/2009 | Oron et al. | |

* cited by examiner

*Primary Examiner* — Gabriel Klein
(74) *Attorney, Agent, or Firm* — Daniel J. Long; Robert K. Tendler

(57) ABSTRACT

A projector of multiple skewed light planes or sheets is located adjacent a vehicle to be protected and detectors are arranged to defect the penetration of the light sheets by an incoming object, with the time intervals between the piercing of the planes defining the path of the incoming object and its expected impact time. An array of bullet-firing barrels is arranged to project bullets in ah iron curtain under control of a fire control module that fires a round in a barrel above the projected flight path such that the round impacts the nose of the object and disables it. It is thus the piercing of the skewed light sheets mat provides information as to the impact point of the object as well as its time of arrival so that a round can be fired to intercept the object as it arrives at the iron curtain.

23 Claims, 7 Drawing Sheets

METHOD AND APPARATUS FOR PROTECTING VEHICLES AND PERSONNEL AGAINST INCOMING PROJECTILES

RELATED APPLICATIONS

This Application is a divisional of U.S. application Ser. No. 11/660,246 filed Feb. 13, 2007 and claims rights under 35 USC §119(e) from U.S. Application Ser. No. 60/686,477 filed Jun. 1, 2005, the contents of which are incorporated herein by reference.

FIELD OF THE INVENTION

This invention relates to countermeasures against projectiles and more particularly to countermeasures against rocket propelled grenades (RPGs).

BACKGROUND OF THE INVENTION

One of the most devastating and prolific weapons currently in use are rocket-propelled grenades which are launched, for instance, against jeeps or other vehicles from very short range in which the rocket-propelled grenade is a shoulder-launched weapon. These weapons are inexpensive and can cause tremendous damage, with no current effective countermeasure available. The incoming velocity of such rocket-propelled grenades is between 150 and 300 meters per second, and there is little time to react with any sort of a countermeasure. Particularly vulnerable are HUMMVs, which are used for patrols. However, other vehicles, including trucks and armored personnel carriers, are also vulnerable to such crude weaponry.

In order to countermeasure a rocket-propelled grenade, which must be done within a couple of milliseconds, it has been suggested to project 22 caliber rounds towards the rocket-propelled grenade to intercept the nose of the rocket-propelled grenade. This neutralizes the RPG by deactivating the fuse.

More particularly, it is known that rocket-propelled grenades explode on impact, with the impact being sensed at the nose of the rocket-propelled grenade. The impact trigger sends signals down the length of the rocket-propelled grenade to ignite its explosive charge. If the nose of the rocket-propelled grenade is somehow disabled, then the charge will hot ignite and the RPG will strike the vehicle like a rock, with little damage.

The task therefore is to intercept the RPG in flight and to neutralize it before it can strike its intended target. From start to finish, from a launching, which may be as near as 50 feet away, to striking and detonating against a target, there are only milliseconds to sense the launch and countermeasure this type of threat.

One proposal had been for the projection of multi-spectral planes arid to detect by the color of the reflected responses from a projectile going through the planes the exact position of the projectile, thereby to be able to launch an effective countermeasure against the incoming RPG. However, this type of system involves a large number of different detectors and transmitters and, more importantly, is a very complex and expensive system to build. It was therefore clear that a less expensive, more easily deployed system needed to be developed.

By way of further background, for instance with a jeep traveling down an urban street, the jeep is vulnerable to RPG attack, which takes place in two phases. The RPG, when shoulder-launched, travels at about 150 meters per second and then accelerates to close to 300 meters per second in the second phase. The dual speed process was an attempt to obtain an ordnance that could work from as much as 150 feet away from the target to as little as 50 feet. RPGs are not usually launched from a distance of more than 150 feet away because of their limited accuracy. Thus, even though the rocket-propelled grenade increases its velocity so as to make it a lethal weapon at larger range, its accuracy is so horrendous that those using RPGs prefer to get in close arid preferably within 50 feet of the target.

A rocket-propelled grenade launched at 50 feet has a travel time of only a few milliseconds and it is therefore incumbent upon a countermeasure to quickly detect the presence of an RPG attack, locate the RPG and provide a countermeasure that involves damaging or incapacitating the nose of the RPG.

SUMMARY OF INVENTION

Rather than using multi-spectral sheets of light and multiple detectors and transmitters, in the subject invention, from a single source point, preferably off the end of the vehicle to be protected, a number of skewed planes of light are projected out from the vehicle. These planes are not parallel but are rather tilted or angled one to the other, with the piercing of the various planes by the RPG providing a measure of the direction from which the RPG is coming and its position.

When, for instance, a number of light sheets are cocked at an angle relative to each other, coming from a single point, and when something breaks through these beams, the reflected light back to the source is detected by detectors, one each per beam, such that each pattern of breaks that represents the RPG coming in along a unique flight path through these beams provides information that can be compared to stored information in a lookup table. In one embodiment only the intervals between the plane piercings are measured; and it is a finding of this invention that such measurements provide sufficient information to detect the path of the RPG and its time of arrival.

In one embodiment, the RPG is countermeasured by providing the protected vehicle with a horizontal bar of muzzles of barrels pointing downwardly at closely spaced intervals. The associated downward trajectories of bullets fired by the barrels provide a so-called iron curtain spaced from the protected vehicle through which the RPG must pass. Having determined the flight path arid the arrival time at the iron curtain, selected barrels or muzzles fire their rounds at the exact time that it is calculated that the founds will meet the nose of the RPG.

In this embodiment, the barrels are pointed downwardly in a vertical plane that constitutes the aforementioned iron curtain, with the vertical plane needing only to be displaced a couple of inches from the side of the vehicle that is to be protected.

Even though the rain of downwardly projected bullets is only inches from the vehicle to be protected, they instantaneously disable the nose of the RPG and the RPG impacts the vehicle without exploding.

It has been found that by measuring the time intervals between the piercings of the projected skewed light planes, one can exactly predict the direction of travel of the RPG. This then is used to identify under which of the barrels the RPG will arrive, and also the exact time that it is projected to pass under the barrel.

Having ascertained which of the downwardly projecting barrels are to be fired, one can then fire one or more of the barrels surrounding the intersection of the flight path line with the iron curtain plane to incapacitate or countermeasure the incoming RPG.

All one needs to know is the location of the source of the skewed light panels and their position in space relative to the protected vehicle to have an accurate model of all of the possibilities for an incoming RPG. This is then used to provide a manifold or lookup table so that by determining the intervals of piercing of adjacent light panels, one can quickly ascertain which of the barrels is to have its round fired, and when.

One, of course, must know where the source of the skewed light panels is relative to the vehicle so that one can know, for a given set of time intervals, where the light sheets are and the direction that the RPG is coming through them.

Note that the key to the subject invention is the skewing of the projected light sheets. The light sheets are not parallel to each other because if they were, then the RPG could go through multiple planes and yet give the same interval result. The fact that the light sheets are angled with respect to each other means that when a line crosses through the sheets such as an RPG crossing across the sheets of light, one can determine that the RPG is coming through a light sheet at a particular point in space. Note that the subject system could measure the time instant that the RPG breaks the light sheet and reflects light back to the light sheet source. However, adequate information can be obtained by measuring the interval from one sheet-piercing to another and comparing the pattern of intervals to intervals in a matrix of all of the possible flight path angles and projected impact times, all based on intervals alone.

Note that RPGs are difficult to stop altogether. The countermeasure of the subject invention stops the RPG from detonating so that its impact would be no more severe than a rock thrown at the vehicle. Knocking off the nose of the RPG is preferable. However, if the nose is broken or even cracked or bent slightly, this prevents the RPG contact trigger from setting off its explosive charge because the countermeasure breaks the line between the trigger and the charge.

In one embodiment, the protected vehicle is provided with an iron curtain of bullets from a fixed horizontal array of barrels or muzzles. One calculates by the intervals through a matching process which one or more of the barrels should fife bullets at and at what time so that three to four bullets are fifed to make sure that the RPG is effectively countermeasured.

In order to ascertain where the RPG is, a pulsed laser source has an output that is transformed from a point source to a number of lines and thus a number of light sheet planes by the simple expedient of using a Dammann hologram diffractor. The result is that the pulses result in skewed sheets that bathe a protected area around the vehicle with radiation that is reflected hack along the same path to a series of detectors, one for each sheet. The pattern of detected return pulses corresponds to the direction that the RPG is coming from and its range. Once the direction and range are known through applying a lookup table, which is a very fast way of processing data, a fire control unit triggers the appropriate firing of rounds from the designated barrels in time to knock out the nose of the RPG.

By providing a series of skewed sheets of light and being able to know when the RPG penetrates each of the sheets, and by measuring the reflected pulses, one can defect the time intervals between the returns and therefore know sufficient data about the incoming RPG, with the pattern of the intervals representing the direction that the RPG is coming in from and its position.

In order to develop the manifold of lookup table, one calculates for each direction of RPG travel where that flight path line intersects the skewed planes and at what time an RPG would penetrate the planes if it were to arrive at the iron curtain at a predetermined time. Since there are an infinite number of flight path lines that intersect these planes and associated times of intersection, there is a unique set of intervals between the penetrations of the different planes that identifies when the RPG would be under a given barrel. It is this unique pattern of intervals that represents the direction of the incoming RPG arid iron curtain impact time.

As mentioned before, one need only provide the array of downwardly pointing barrels a few inches from the vehicle. In one embodiment, an array of barrels is mounted to either side of the vehicle on horizontal metal bars, with the bars being provided with barrels and firing apparatus so that they are fired almost straight down. If all the bullets were fired from all the barrels simultaneously, one would have a sheet or iron curtain of downwardly projecting bullets as a screen to protect the vehicle. However, by knowing the impact point on the iron curtain one need only fire a few bullets.

The vehicle in one embodiment is provided with bars to either side of the vehicle, although bars to the front and the rear of the vehicle can also be provided. However, shots coming directly at the vehicle from in front or behind are less likely to hit the vehicle. Thus side impact protection is paramount.

It is possible in a second embodiment to provide skewed light plane projectors at either end of the vehicle because the accuracy with which the position of the incoming RPG can be ascertained is less if the RPG comes in at the end of the vehicle at which the source or projector is located.

By having two projectors of the skewed light planes, one at the front of the vehicle and one at the back, then the lack of accuracy due to the shallow angle associated with an RPG coming towards the back projector is more than compensated for by the projector at the front, or vice versa.

It is noted, of course, that the closer the projector or source is to the RPG, the less the accuracy, such that the accuracy starts to diminish the closer to the source the RPG is. This also means that there is less time to respond, due to the fact that the intervals are much shorter. Thus the use of projectors fore and aft of the vehicle compensates for the lack of accuracy in these cases.

While the subject invention has been described in connection with RPGs, other incoming ordnances are within the scope of this invention, as are systems that merely look to detect the location and sped of an approaching object, such as another vehicle.

In summary, a projector of multiple skewed light planes or sheets is located adjacent a vehicle to be protected and detectors are arranged to detect the penetration of the light sheets by an incoming object, with the time intervals between the piercing, of the planes defining the path of the incoming object and its expected impact time. An array of bullet-firing barrels is arranged to project bullets in an iron curtain under control of a fire control module that fires a round in a barrel above the projected flight path such that the round-impacts the nose of the object and disables it. It is thus the piercing of the skewed light sheets that provides information as to the impact point of the object as well as its time of arrival so that a round can be fired to intercept the object as it arrives at the iron curtain.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
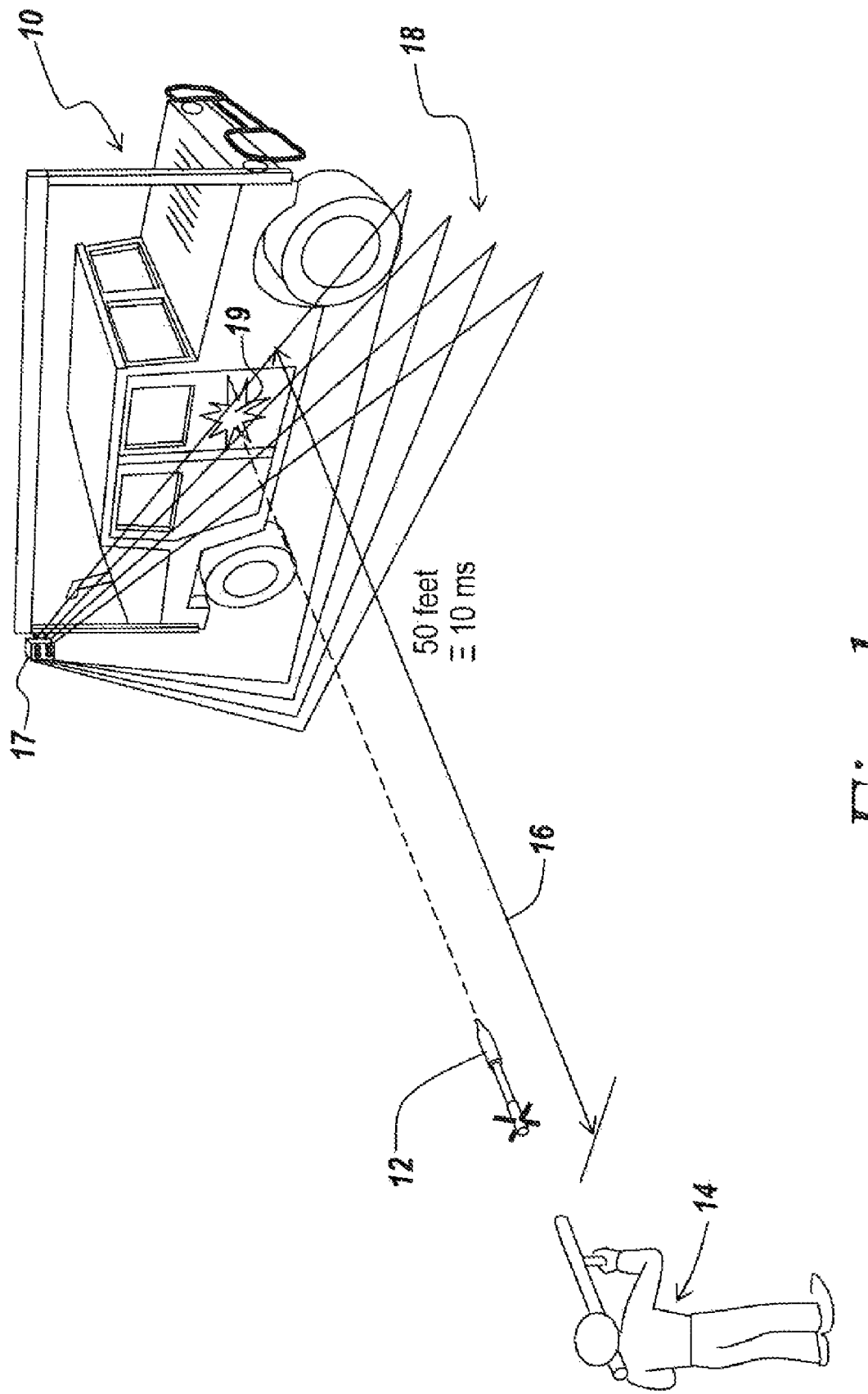
FIG. 1 is a diagrammatic illustration of the use of an RPG to attack a vehicle from as little as 50 feet away, which corresponds to a flight time of 10 microseconds, also illustrating the projection of skewed light planes to be able to detect from reflections the position of the RPG.

Referring now to FIG. 1, a vehicle 10, which maybe a HUMMV, is to be protected against an RPG 12 attack, in which the RPG is shoulder launched by individual 14 who may be as close as 50 feet from the vehicle as illustrated by double-ended arrow 16. The total length of time to be able to react and countermeasure the launched RPG is on the order of milliseconds arid for 50 feet, corresponds to an elapsed time of 10 milliseconds. Also illustrated is a source 17 of skewed light sheets 18, the penetration or piercing of which determines the direction and time of impact 19 with vehicle 10.

Figure 2:
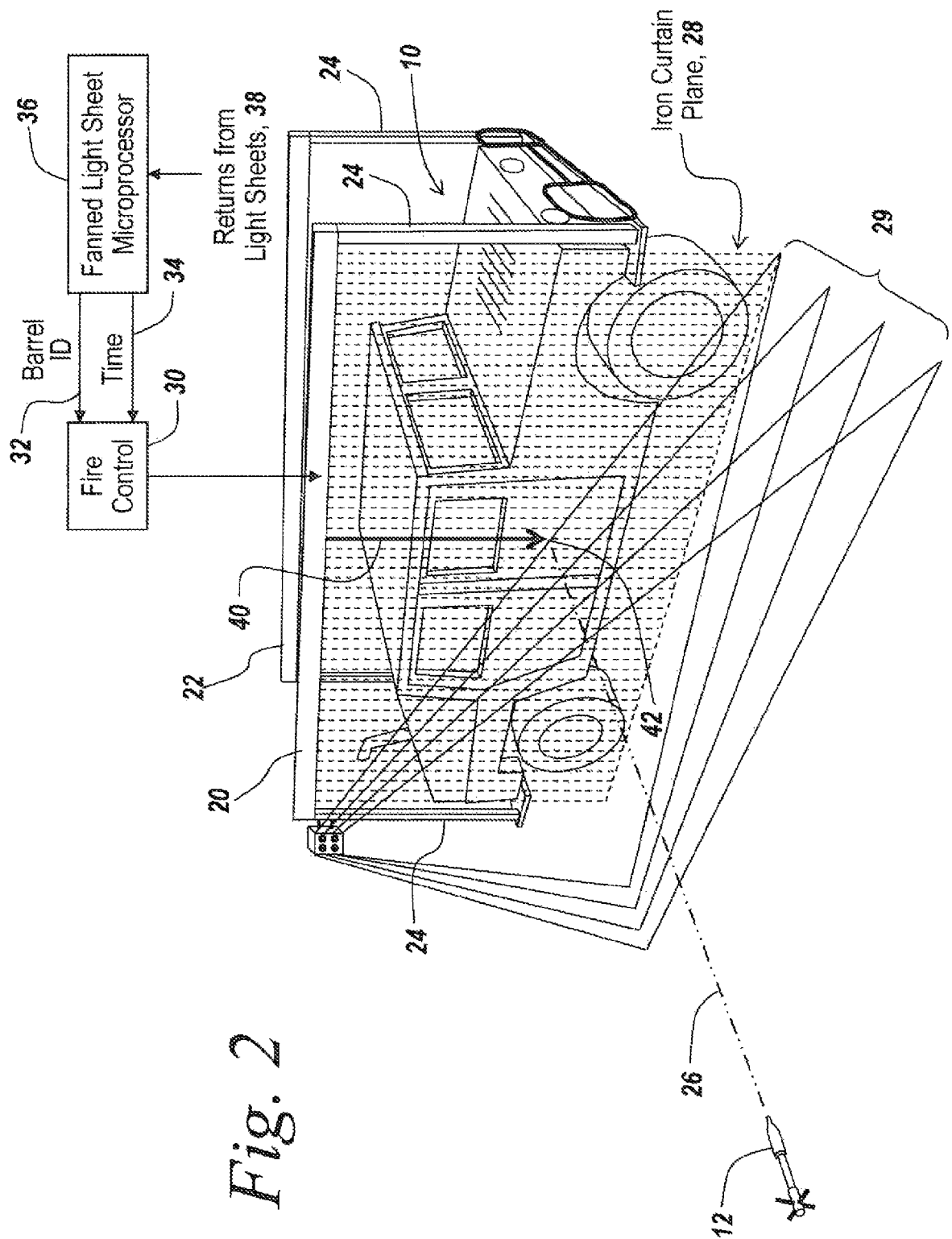
FIG. 2 is a diagrammatic illustration of the provision of a countermeasure system to either side of a vehicle in which the countermeasure system employs an array of gun barrels that are actuated by a fire control module to fire rounds to intercept the hose of the RPG for disabling it.

In order to protect vehicle 10 from the effect of an RPG exploding against the vehicle and referring to FIG. 2, a barrel bar 20 is mounted to one side of the vehicle arid a barrel bar 22 is mounted to the other side of the vehicle. Note that these bars are spaced from the sides of the vehicle through supports 24 mechanically affixed to the vehicle frame or body. An RPG 12 is shown fired towards vehicle 10 along a line of flight 26 such that it arrives at a plane 28, called the iron curtain, defined by the plane of the downward bullet trajectories. As will be appreciated, the bullet paths to form a curtain of projection to the side of the vehicle as indicated. Each of the paths indicated by the dotted lines indicates the path of a downwardly projected bullet, which is fired using a fire control module 30 that in one embodiment takes into account the intersection of line 26 with plane 28 to identify the appropriate barrel to be fired as illustrated at 32, and the time that a round is to be fired as illustrated at 34. This information is derived from a skewed light sheet microprocessor 36. This processor takes reflected returns from the light-sheets and provides the relevant information to the fire control 30 so as to fire the round from the appropriate barrel once knowing the direction of the incoming RPG and its time of arrival. Here, as can be seen by arrow 40, a round is fired downwardly from the associated barrel such that it intersects the nose of RPG 12 as its nose passes through the iron curtain as defined by the plane of the bullet trajectories, and more specifically at point 42.

Figure 3:
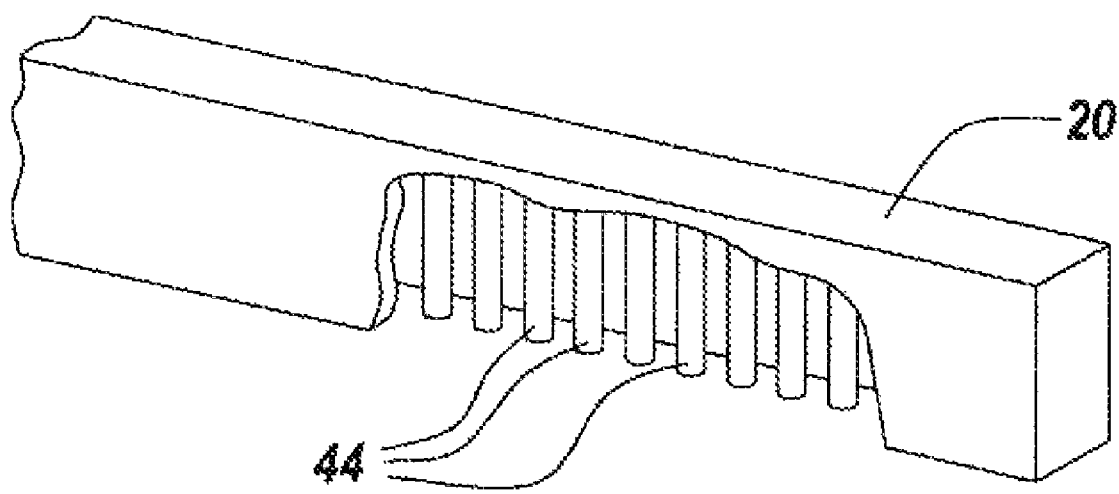
FIG. 3 is a diagrammatic illustration of one of the gun barrel-carrying bars of FIG. 2, illustrating parallel, downwardly projecting barrels.

As shown in FIG. 3, a number of barrels 44 are mounted within bar 20 so as to aim bullets in a downward trajectory to protect the vehicle, in one embodiment in a hail of bullets to countermeasure the incoming RPG. While all barrels may be fired simultaneously, as part of the subject invention only a few barrels need fire rounds.

What is necessary is a way of identifying which of the barrels should be fired and at what time. This information is derived in the subject invention through fanned, skewed light sheets as described in FIG. 4. The problem then becomes how to detect the incoming RPG, find its trajectory or path and be able to fire a particular round from a particular barrel such that the round impacts the nose of the RPG at the exact and precise moment that the RPG is passing through the iron curtain plane.

Figure 4:
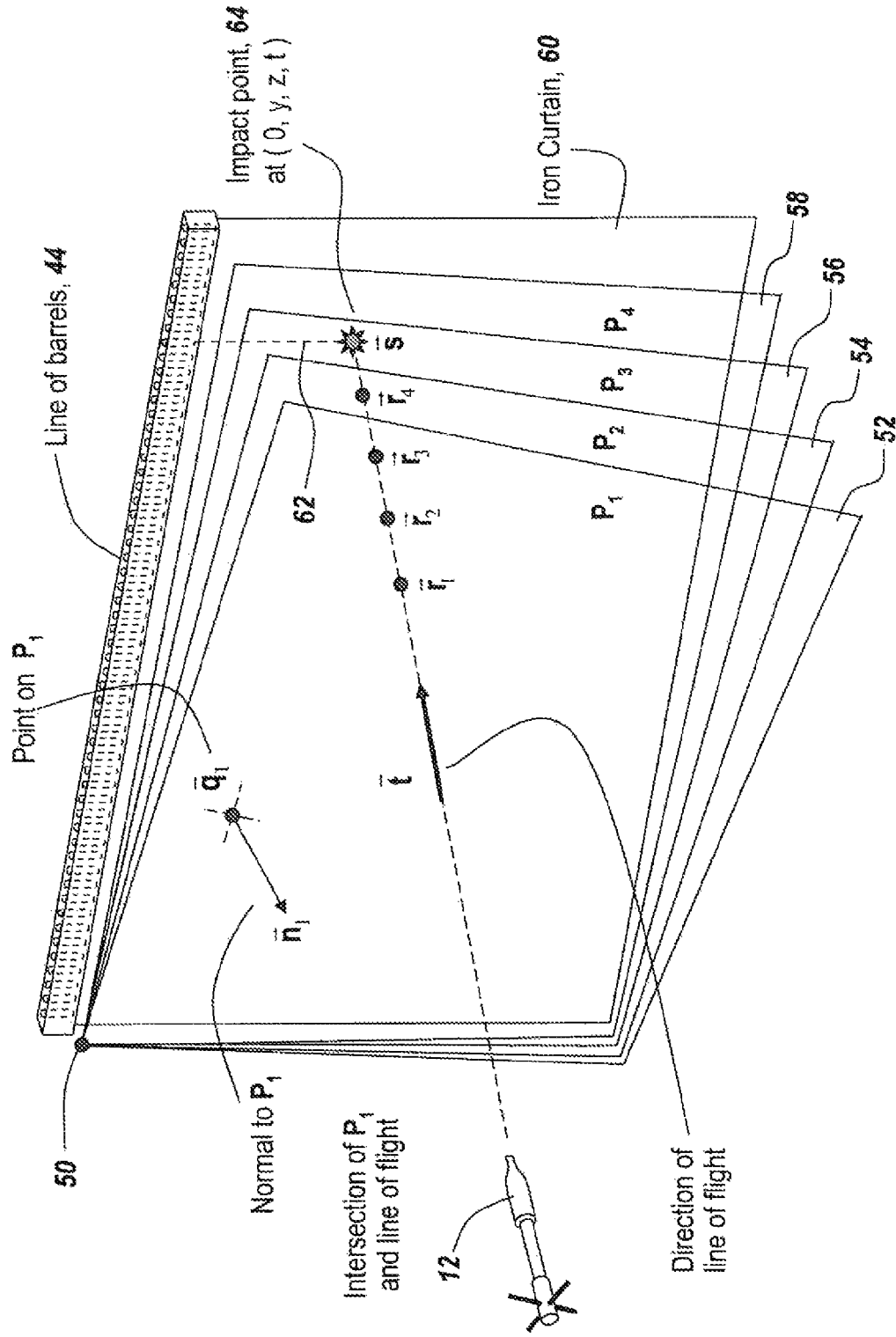
FIG. 4 is a diagrammatic illustration of the projection of skewed light sheets from a source at one end of the bar carrying the barrels, indicating piercing points of the RPG nose through each of the skewed light sheets, with the time at which each of the pierce points is detected used to determine the time of arrival of the RPG at the iron curtain plane associated with the barrels, thus to be able to identify the barrel from which a round is to be fired to intercept the nose of the RPG.

How this is accomplished is illustrated in FIG. 4. Here it can be seen that bar 20 carries a skewed light sheet projector source 50, which produces sheets or planes of light 52, 54, 56 and 58. It is important that these planes be skewed as opposed to being parallel. It is possible to generate these skewed planes of light adjacent the vehicle to be protected to be able to detect from reflected radiation from the nose of RPG 12 as it penetrates the various planes which of the barrels 44 is to fire its round and when. This is to have the associated bullet in iron curtain plane 60 along trajectory 62 impact the nose of the RPG at impact point 64.

It is noted that in this embodiment, four individual skewed light sheets or planes are projected, with RPG 12 piercing planes 52, 54, 56 and 58 along its flight path 66 at points $r_1$, $r_2$, $r_3$ and $r_4$.

It is the purpose of the subject invention to detect the point on a plane and its piercing time as the RPG travels toward its intended target.

It is a finding of this invention that complete fire control can be accomplished by noting the time of piercing in terms of reflected light back to projector or source 50 for each of the piercings of the planes such that $r_1(t_1)$, $r_2(t_2)$, $r_3(t_3)$ and $r_4(t_4)$ yield intervals $I_1=t_2-t_1$, $I_2=t_3-t_2$ and $I_3=t_4-t_3$.

It will be shown that having derived these intervals in real time, it is possible to calculate the iron curtain impact point and a time of arrival of the RPG at the impact point, which in turn is utilized to identify which barrel's round should be fired and when.

Figure 5:
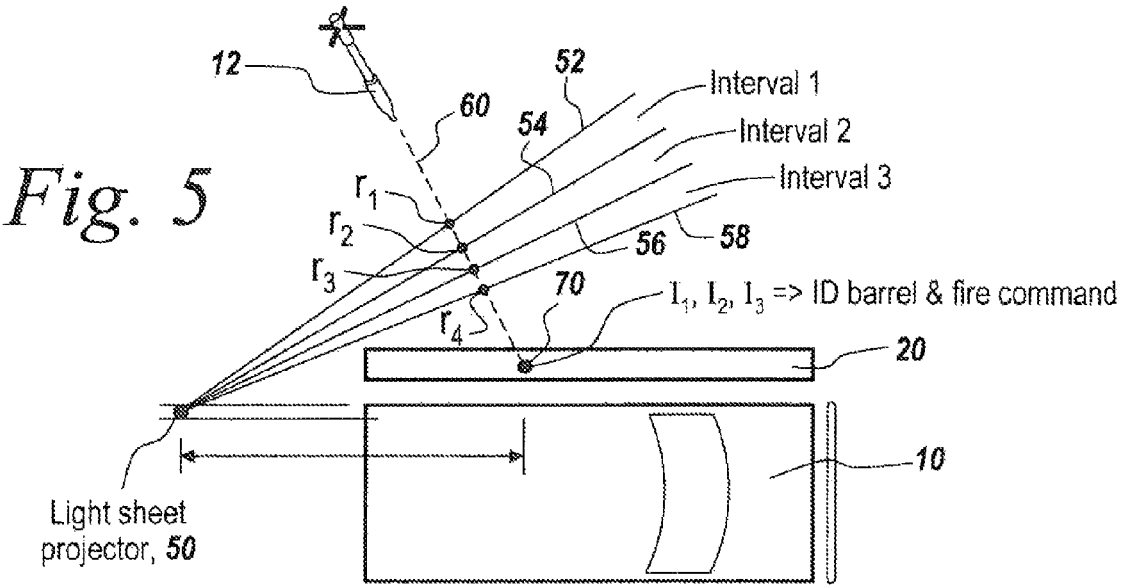
FIG. 5 is a diagrammatic top view of the subject system for protecting a vehicle, illustrating a top view of the array of barrels as well as a light sheet projector that projects four different light sheets skewed one to the other, with the piercing of the four light sheets determining Intervals 1, 2 and 3, which are used to identify the barrel from which to fire a round and to generate a fire command so that the fired round impacts the nose of the incoming RPG as it intersects the iron curtain plane.

Referring now to FIG. 5, in terms of the protection of vehicle 10, it will be appreciated that the light sheet projector at source 50 projects light sheets 52, 54, 56 and 58, in one embodiment at an angle of approximately 30° to the centerline of the vehicle. Here it can be seen mat piercing points $r_1$, $r_2$, $r_3$ and $r_4$ are along the projected line of flight of the RPG, namely line 66. The point at which the RPG passes the iron curtain plane of bullet trajectories immediately under bar 20, namely point 70, is determinable by measurement of Intervals 1, 2 and 3, which yields the identification of the barrel from which a round is to be fired as well as the time of firing.

Figure 6:
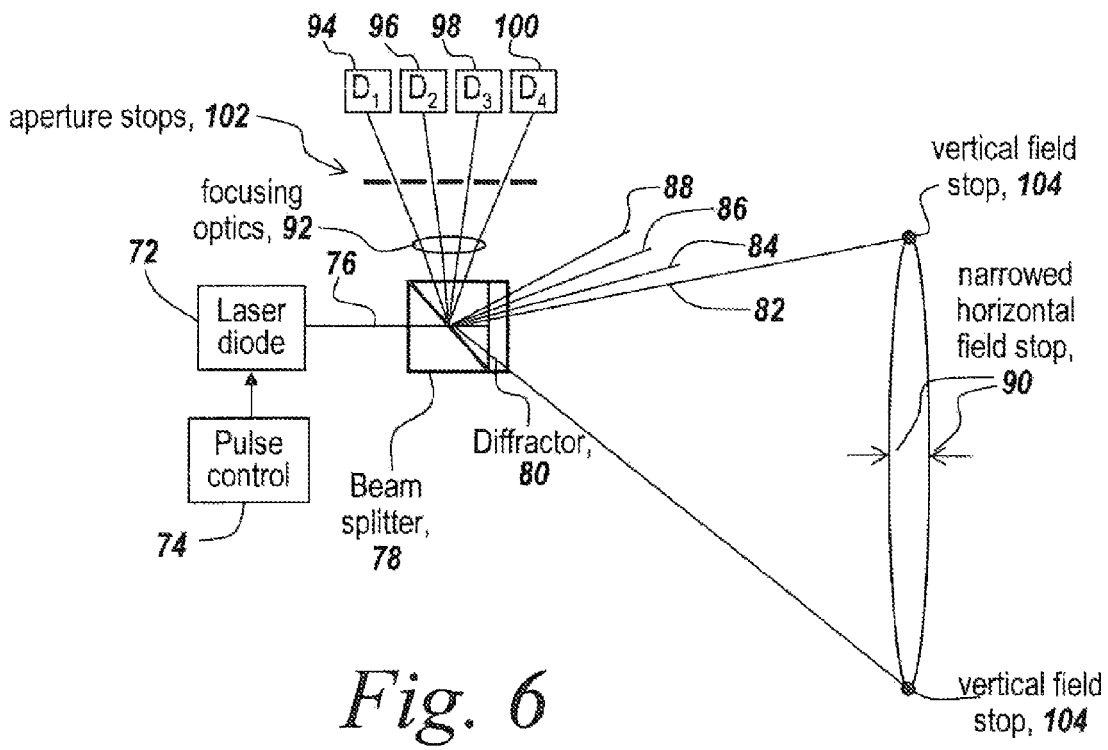
FIG. 6 is a diagrammatic illustration of the use of a pulsed laser diode having an output coupled through a beam splitter and a diffractor that takes a point source and forms multiple light sheets, also illustrating four detectors for detecting returns from the four light sheets with aperture stops limiting the sheet to which a detector responds to a narrow horizontal field and an extended vertical field.

Referring now to FIG. 6, in order to form the skewed light planes, in one embodiment a pulsed laser diode 72 under control of a pulse control 74 emits pulses at its output 76 that impinge on a beam splitter 78. The output of the beam splitter is a point of light that is coupled through a diffractor 80, the purpose of which is to change the point of light into light sheets, here illustrated diagrammatically at 82, 84, 86 and 88. In one embodiment a Dammann hologram diffractor is used as the optical element that forms the light sheets.

The light sheets are bounded so that they are exceedingly narrow, as illustrated by double-ended arrow 90 for sheet 82 so as to provide a narrow horizontal field dimension defined by a field stop that is placed between focusing optics 92 to one side of the beam splitter and an array of detectors $D_1$, $D_2$, $D_3$ and $D_4$, here respectively 94, 96, 98 and 100. Each of the detectors views its own light sheet due to the use of an aperture stops at 102 configured so as to provide the aforementioned narrow horizontal field 90 while at the same time providing an extended vertical field 104.

In operation the laser diode is pulsed to provide pulsed sheets of light projected but adjacent the vehicle to be protected due to the utilization of the Dammann diffractor, which is a diffractive optical outlet that sends out discrete sheets of light. As will be appreciated, the Dammann hologram-type device is basically a point-to-line converter and is an injection molded optical element that has a surface pattern that is used to generate a series of lines and therefore planes or sheets of light.

Thus the diffractive optical outlet sends but sheets of light. When something breaks the sheet of light, whatever is breaking the sheet of light reflects light back through the diffractive optical element, where it impinges upon the beam splitter and is then focused on the various detectors. In this manner, the outputs of the detectors measure the piercing times.

Note that the projector light source is arranged so that one can ascertain where the fixed skewed light planes are in space, measured from the source point.

It has been found that the optimal number of planes is four, such that three different intervals provide sufficient fire control information.

Note that if four planes are involved, there will be three intervals that can be measured. This yields three equations and three unknowns to provide the direction and position of the incoming RPG. Accuracy can be improved by providing more sheets of light, although as a practical matter, four skewed light sheets each angularly separated by a few degrees provide for accurate description of the flight path.

In one embodiment, although the planes are skewed at a couple of degrees apart, the general direction relative to the centerline of the vehicle is about 30°. What this means is that four planes can be produced at a source by a single transmitter set. Note, one is not necessarily worried about inaccuracies close to the source because if an RPG were to come into that area, it would likely miss the vehicle. Thus, protecting the sides of the vehicle is the most important consideration to be able to minimize damage due to ah RPG attack.

What is now presented is a mathematical formulation of how to derive the line or direction at which the RPG is attacking the vehicle and its arrival at the iron curtain plane.

Since it is important to describe a line that intersects the four planes, the first thing to do is to describe what a plane is. In this case, a plane is defined by a normal to a point on a plane. The concept is to take the four planes and intersect them with a line and then derive a description of where the line intersects the planes in terms of a vector.

As will be seen, one can calculate the direction of the incoming RPG or its path in terms of an RPG passing through some point x with a tangent t. It is also possible to ascertain the path of the RPG as it passes through each plane by measuring some range or position r or some distance away from the source. Based on knowing where the source is relative to the vehicle, one can calculate from the above-mentioned intervals where the RPG would hit the iron curtain plane.

In order to be able to use a lookup table or manifold as it is sometimes called, it is necessary to mathematically run a large number of directions of flight lines through the known positions of the planes arid to calculate the intervals that one would expect with an RPG, for instance, traveling at a speed of 300 feet per second. Having a large lookup table with a large number of possibilities, one can detect through interpolation processes where the RPG will intersect the iron curtain plane and at what time.

Figure 7:
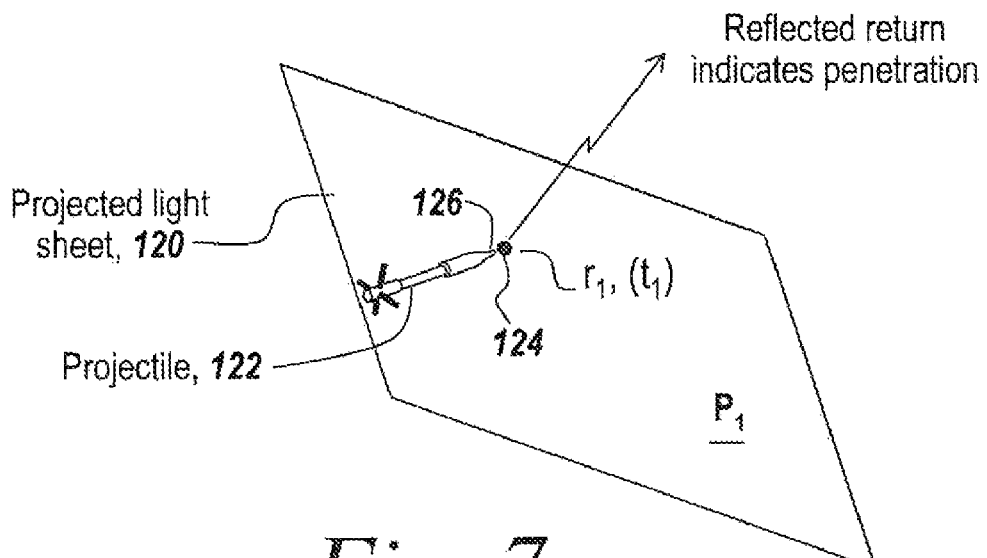
FIG. 7 is a diagrammatic illustration of a projected light sheet indicating that at point $r_1(t_1)$ light is reflected back towards the source from which the light sheet is identified as well as the piercing point and the time of piercing.

Referring now to FIG. 7, what is shown is a projected light sheet 120, which may be either of a pulsed or CW variety, the sheet being in plane $P_1$. An object piercing the plane, here 122, is described by the position at which it pierces the plane as being at position 124, which is defined by a range $r_1$ at a time $(t_1)$.

The arrival of object 122 at light sheet 120 is detected by reflections from the object piercing the light sheet, in which light from the light sheet impinges on a surface 126 of object 122 and results in reflected returns to indicate penetration or piercing of the light sheet. Here that which is defined is $P_1$, the plane, $r_1$, the range and $(t_1)$, the time of penetration.

Figure 8:
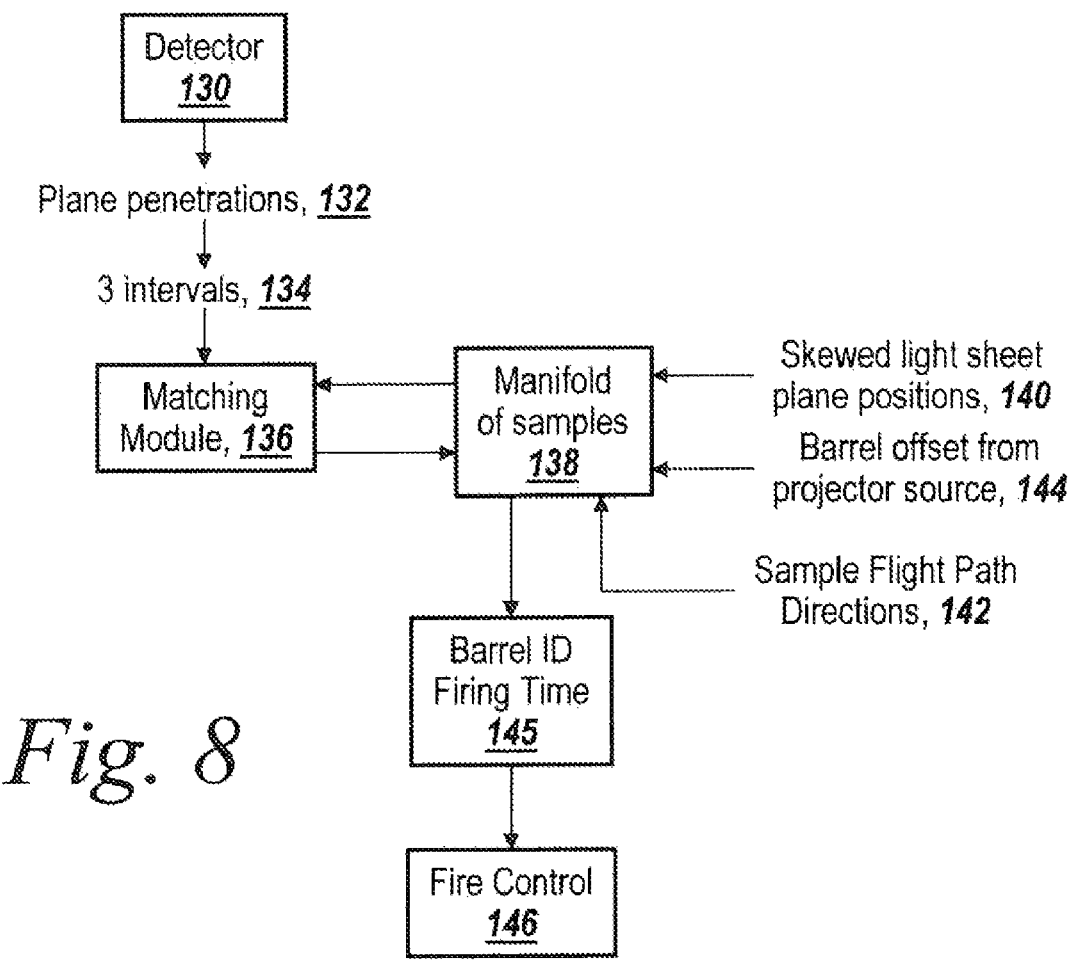
FIG. 8 is a flow chart showing a system for detecting light sheet piercings and the ascertaining of three intervals used in a matching module to match with a manifold of intervals, resulting in barrel identification and firing tunes, with inputs to the manifolds including light sheet plane positions arid resulting intervals that would be associated with various incoming projectile directions, along with barrel offset from the projector source such that the barrel number and time of arrival of the head of an RPG at the iron curtain when matched to stored intervals, results in fire control for the indicated barrel; and, FIG. 9 is a schematic diagram of one embodiment of the subject invention.

Having been able to establish the point and time of penetration of an object with the planes and referring now to FIG. 8, the four detectors of FIG. 6 are shown in FIG. 8 as detector 130, which detects plane penetrations 132 from which one can derive three intervals 134, assuming penetration of four planes. The measured time intervals are coupled to a matching module 136 that matches these intervals with an entire array of intervals from a manifold 138 of samples, which are derived from piercing the known and skewed planes from a large number of known flight path directions.

In order to populate manifold 138, the skewed light plane sheet positions 140 are entered along with sample flight path directions 142, Which can be mathematically generated. Thus in the manifold one has the skewed light sheet plane positions, a large number of directions from which an RPG can penetrate a sheet, the corresponding penetration intervals and a calculation of the particular barrel and firing time associated with each of these directions. The barrel offset from the projector source 144 is also entered in order to be able to calculate the particular barrel from which the round is to be fired, based on its offset from the source of the skewed planes.

The matching, in a least-squares fit of any other convenient matching algorithm, matches the measured penetration intervals with those of the manifold arid when there is a match, the barrel number and time of penetration of the iron curtain plane is known. Upon a match, this information is read out of manifold of lookup table 138 as illustrated at 145. Knowing the barrel number and the time of penetration of the RPG of the iron curtain results in a fire control signal 146 firing the round in the associated barrel.

What will be seen is that one has a manifold or lookup table of all of the possible incident trajectories or flight path directions for the RPG and a table of corresponding penetration times or intervals so that by common lookup table techniques one can identify the barrel having the round to be fired along with the exact time that the round should be fired so as to meet the nose of the RPG.

Figure 9:
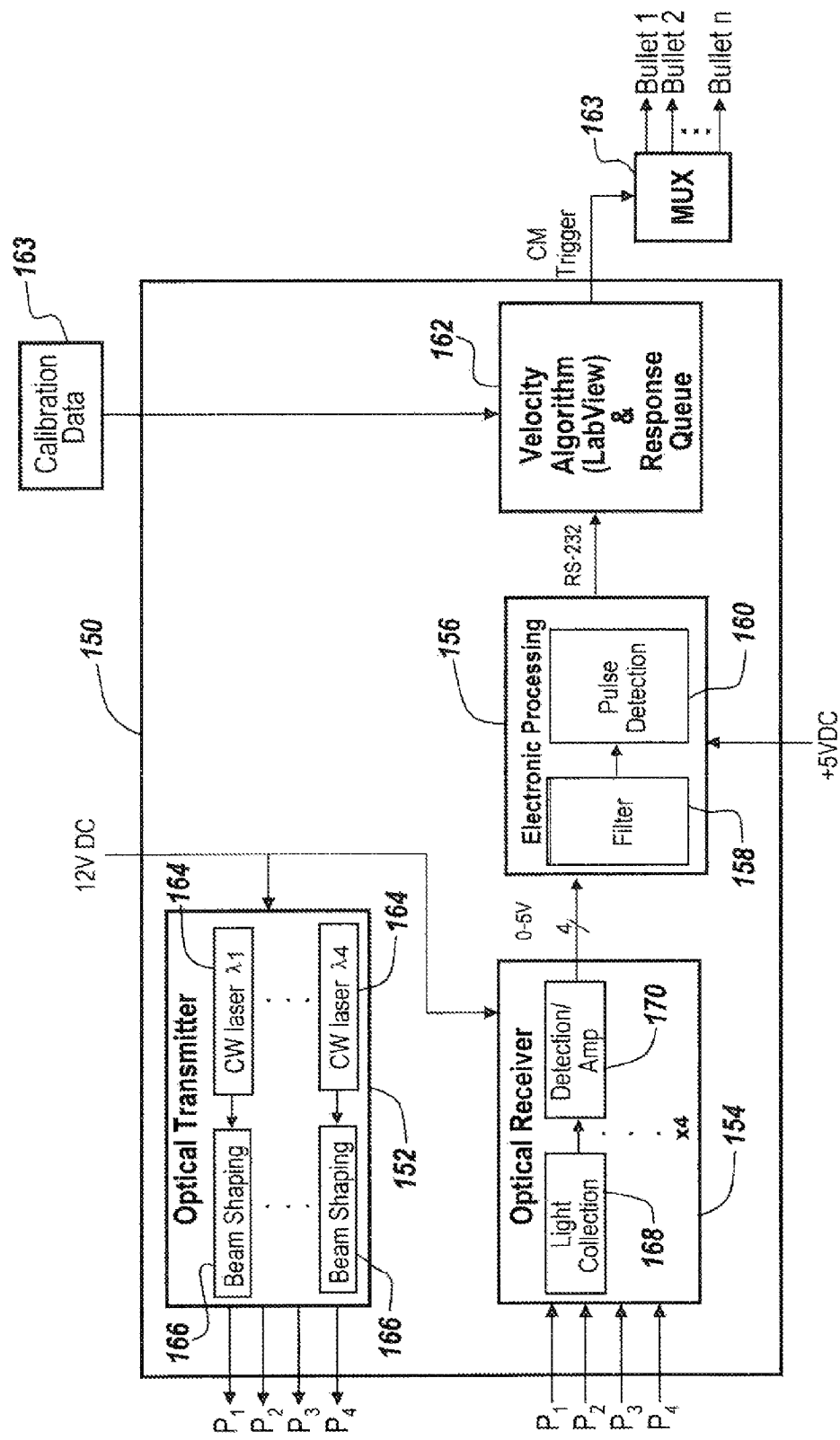

Referring now to FIG. 9, in one embodiment a functional block diagram is shown in which the RPG sensor 140 includes an optical transmitter 152 and an optical receiver 154, with the optical receiver being coupled to electronic processing 156 that includes a filter 158 and pulse detection 160 that detects returns from objects penetrating the various skewed planes. The output of the electronic processing is applied to a velocity algorithm and response cue module 162, which functions as the manifold described in FIG. 8.

It is noted that the trigger output of response cue 262 is coupled to a MUX that has multiple outputs, one each per bullet. It is the purpose of this MUX to decode a trigger word and fire the appropriate countermeasure bullet.

In terms of an optical transmitter, one can have a number of CW lasers, here illustrated at 164, coupled to beam-shaping units 166 so as to project but into space the four skewed light planes described above. However, as mentioned hereinbefore, one can utilize only brie laser arid have a Dammann hologram diffractor point-to-line generator generate the skewed fields depending on the patterning of the Dammann device.

Optical receiver 54 has light collection optics 168 that are coupled to detection amplifiers 170 that output four sheet penetration times to the electronic processing associated with module 156.

While the subject case utilizes optical stops to mask off the four detectors to view four different regions of space and thus four different skewed planes, the planes can be further distinguished one from the other by color coding them and utilizing four different color projectors with point-to-line transforms. In this case, filter 158 would be a set of filters tuned one each to the wavelengths of the four skewed planes.

However, a less costly system uses the aforementioned optical stops to be able to distinguish returns from each of the skewed planes.

What is now described is the mathematical underpinnings for being able to ascertain which of the bullets in the iron curtain should be fired and when based solely on detected pulse return intervals from penetrations of the aforementioned four-light sheets.

Description of Mathematical Approach

FIG. 4 shows the line of flight of the RPG and its intersection with a series of planes ($P_1$, $P_2$, $P_3$ ...) at points ($r_1$, $r_2$, $r_3$ ...). From the points of intersection, one can estimate the point and time of impact. Each plane is determined by its normal direction, $\vec{n}$, and one point on the plane, $\vec{q}$, which are known "a priori". The normal to the plane is expressed in terms of its Euler angles, $$\vec{n} = \begin{pmatrix} n_x \\ n_y \\ n_z \end{pmatrix} = \begin{pmatrix} \cos(\theta_p)\cos(\phi_p) \\ \sin(\theta_p)\cos(\phi_p) \\ -\sin(\phi_p) \end{pmatrix} \quad (1$$

and the point on the plane by its Cartesian coordinates $$\vec{p} = \begin{pmatrix} p_x \\ p_y \\ p_z \end{pmatrix} \quad (2$$

Any other point on the plane, $$\vec{r} = \begin{pmatrix} x \\ y \\ z \end{pmatrix}, \quad (3$$

satisfies the equation $$\vec{n} \cdot (\vec{r} - \vec{p}) = 0, \quad (4$$

where x is the distance to the iron curtain plane, and y and z are coordinates in that plane corresponding to the position left and down, respectively, relative to an origin.

Similarly the line of flight of the RPG is determined by the tangential direction, $\vec{t}$, and one point on the line of flight, $\vec{s}$, $$\vec{t} = \begin{pmatrix} \cos(\theta)\cos(\phi) \\ \sin(\theta)\cos(\phi) \\ -\sin(\phi) \end{pmatrix} \quad (5$$

and $$\vec{s} = \begin{pmatrix} 0 \\ y \\ z \end{pmatrix} \quad (6$$

where $\vec{s}$ is the point of impact (y,z) on the iron curtain (x=0). Any point on the line of flight, $\vec{r}$, satisfies the equation $$\vec{t} \times (\vec{r} - \vec{s}) = \vec{0} \quad (7$$

The point where the line of flight of the RPG intersects a plane, is that $\vec{r}$ that satisfies equations (4 and (7 simultaneously.

$$r(\vec{n}, \vec{p} \mid \theta, \phi, y, z) = \quad (8$$
$$\begin{pmatrix} n_x & n_y & n_z \\ -\sin(\phi) & 0 & -\cos(\theta)\cos(\phi) \\ -\sin(\theta)\cos(\phi) & \cos(\theta)\cos(\phi) & 0 \end{pmatrix}^{-1} \begin{pmatrix} \vec{n} \cdot \vec{p} \\ -z \cdot \cos(\theta)\cos(\phi) \\ y \cdot \cos(\theta)\cos(\phi) \end{pmatrix}$$

The time of flight between planes 1 and 2 is given by the distance traveled divided by V, the RPG velocity, $$T_2 - T_1 = V^{-1} \lfloor |r(\vec{n}_2, \vec{p}_2 | \theta, \phi, y, z) - r(\vec{n}_m, \vec{p}_1 | \theta, \phi, y, z)| \rfloor. \quad (9$$

Between any two planes, the difference between the measured time difference and the model is $$\epsilon_{n,m}=(T_n-T_m)-V^{-1}[r(\vec{n}_n,\vec{p}_n,\theta,\phi,y,z)-r(\vec{n}_m,\vec{p}_m|\theta,\phi,y,z)] \quad (10)$$

With enough k-many planes, there are as many difference equations N, where $$N=k(k-1)/2, \quad (11)$$

with which the five RPG parameters, $\{\theta,\phi,y,z,V\}$, can be estimated.

With 6 planes, there are 15 equations. Five will be uncorrelated (i.e., independent) and the remaining will be only partially uncorrelated by measurement noise. Standard search algorithms, and methods are used to estimate the set of parameters $\{\hat{\theta},\hat{\phi},\hat{y},\hat{z},\hat{V}\}$ which satisfies the N equations best relative to a criterion of goodness, arid avoid unstable or singular solutions due to the partially uncorrelated equations. The estimated impact point is $$\hat{s} = \begin{pmatrix} 0 \\ \hat{y} \\ \hat{z} \end{pmatrix} \quad (12)$$

and the impact time is $$\hat{T}_{impact}=T_n+\hat{V}^{-1}[\hat{s}-r(\vec{s}_n,\vec{p}_n|\hat{\theta},\hat{\phi},\hat{y},\hat{z})]. \quad (13)$$

As can be seen, from the intervals between the times the RPG hits the sheets and combinations thereof one can determine the incoming angle and instantaneous position to the RPG; and therefore one can predict where the RPG will hit the iron curtain.

While the present invention has been described in connection with the preferred embodiments of the various figures, it is to be understood that other similar embodiments may be used or modifications or additions may be made to the described embodiment for performing the same function of the present invention Without deviating therefrom. Therefore, the present invention should not be limited to any single embodiment, but rather construed in breadth and scope in accordance with the recitation of the appended claims.

What is claimed is:

1. A system for protecting a target from attack by an object penetrating a protected area surrounding the target, comprising:
   a set of skewed light sheets projected from a source adjacent said target into said protected area;
   a detector positioned to detect reflected light returns as said object transits said protected area and pierces said skewed light sheets;
   a first processor positioned to interpret said reflected light returns and establish times and positions of piercings of said skewed light sheets;
   an ordnance-launching device positioned to launch an ordnance to intercept said object at a distance from said target based on said times and positions of said piercings of said skewed light sheets by said object;
   a multiplexer (MUX) operably connected to said ordnance-launching device to control a launch of said ordnance based on said times and positions of said piercings of said skewed light sheets by said object;
   a matching module and a manifold programmed to determine a position of said object relative to said target based on said times and positions of said piercings of said skewed light sheets.

2. Apparatus for ascertaining a position of an object penetrating a protected area surrounding a vehicle, comprising:
   a projector mounted at said vehicle and positioned to project skewed light sheets from a source adjacent said vehicle into said protected area;
   a detector positioned to detect reflected light returns as said object transits said protected area and pierces said skewed light sheets;
   a first processor programmed to interpret said reflected light returns and establish times and positions of piercings of said skewed light sheets; and
   a matching module and a manifold programmed to interpret said times and positions of piercings of said skewed light sheets and establish said position of said object relative to said vehicle.

3. The apparatus of claim 2, wherein said matching module and said manifold are further programmed to interpret said times and positions of piercings of said skewed light sheets to establish a set of time intervals between adjacent light sheet piercings and to ascertain the position of said object relative to said vehicle based on said time intervals.

4. A method for protecting a target from attack by an object penetrating a protected area surrounding the target, comprising the steps of:
   Projecting a plurality of skewed light sheets from a source through a diffractive outlet into the protected area;
   Detecting reflected light returns as the object transits the protected area and pierces said plurality of skewed light sheets;
   From said detected returns, establishing the times and positions of the piercings of adjacent light sheets using a matching module; and
   Launching ordnance to intercept the object at a distance from the target based on the established times and positions of the sheet piercings.

5. The method of claim 4 wherein said source is a pulsed laser diode.

6. The method of claim 4 wherein said diffractive outlet is a Dammann hologram diffractor.

7. The method of claim 4 wherein there are four of said skewed light sheets.

8. The method of claim 4 wherein the intervals of the piercings of said plurality of skewed light sheets are measured and coupled with the matching module.

9. The method of claim 8 wherein said matching module is matched with a manifold to determine the appropriate ordnance to launch.

10. The method of claim 9 wherein said matching is done by a Least-squares fit method.

11. A method for protecting a target from attack by an object penetrating a protected area surrounding the target, comprising the steps of:
    Projecting four skewed light sheets from a pulsed laser diode through a Dammann hologram diffractor into the protected area;
    Detecting reflected light returns as the object transits the protected area and pierces said four skewed light sheets and measuring the piercing intervals with a matching module;
    From said detected returns, establishing the times and positions of the piercings of adjacent light sheets by coupling said matching module with a manifold; and
    Launching ordnance to intercept the object at an iron curtain, said iron curtain being a distance from the target based on the established times and positions of the sheet piercings.

12. The method of claim 11 wherein said skewed light, sheets define planes, the normal of said planes being expressed in terms of its Euler angles, which are $$\vec{n} = \begin{pmatrix} n_x \\ n_y \\ n_z \end{pmatrix} = \begin{pmatrix} \cos(\theta_p)\cos(\phi_p) \\ \sin(\theta_p)\cos(\phi_p) \\ -\sin(\phi_p) \end{pmatrix}.$$

13. The method of claim 12 wherein a point on said plane is defined by its Cartesian coordinates, which are $$\vec{p} = \begin{pmatrix} p_x \\ p_y \\ p_z \end{pmatrix}.$$

14. The method of claim 13 wherein any other point on said plane is $$\vec{r} = \begin{pmatrix} x \\ y \\ z \end{pmatrix}$$

which satisfies the equation $$\vec{n} \cdot (\vec{r} - \vec{p}) = 0.$$

15. The method of claim 14 wherein x, y, and z, are coordinates in said plane that define distance to said pulsed laser diode.

16. The method of claim 15 wherein said object's line of light is determined by a tangential direction, $\vec{t}$, and one point on said line of light, $\vec{s}$, $\vec{t}$ and $\vec{s}$ defined by $$\vec{t} = \begin{pmatrix} \cos(\theta)\cos(\phi) \\ \sin(\theta)\cos(\phi) \\ -\sin(\phi) \end{pmatrix}$$

and $$\vec{s} = \begin{pmatrix} 0 \\ y \\ z \end{pmatrix}$$

respectively, and $\vec{s}$ is the point of impact (y,z) on said iron curtain (x=0).

17. The method of claim 16 wherein any point where said object's line of flight $\vec{r}$ satisfies the equation $$\vec{t} \times (\vec{r} - \vec{s}) = \vec{0}.$$

18. The method of claim 17 wherein said object's line of flight intersects said plane at a point that satisfies the equation $$r(\vec{n}, \vec{p} | \theta, \phi, y, z) =$$
$$\begin{pmatrix} n_x & n_y & n_z \\ -\sin(\phi) & 0 & -\cos(\theta)\cos(\phi) \\ -\sin(\theta)\cos(\phi) & \cos(\theta)\cos(\phi) & 0 \end{pmatrix}^{-1} \cdot \begin{pmatrix} \vec{n} \cdot \vec{p} \\ -z \cdot \cos(\theta)\cos(\phi) \\ y \cdot \cos(\theta)\cos(\phi) \end{pmatrix}.$$

19. The method of claim 18 wherein said object's time of flight between a plane 1 and a plane 2 is given by a distance traveled by said object divided by said object's velocity V, wherein said time of flight is defined as $$T_2 - T_1 = V^{-1} \lfloor |r(\vec{n}_2, \vec{p}_2 | \theta, \phi, y, z) - r(\vec{n}_1, \vec{p}_1 | \theta, \phi, y, z)| \rfloor.$$

20. The method of claim 19 wherein said object's time of flight between said planes is compared to a model and the difference between said object's time of flight and said model is $$\epsilon_{n,m} = (T_n - T_m) - V^{-1} [r(\vec{n}_n, \vec{p}_n | \theta, \phi, y, z) - r(\vec{n}_m, \vec{p}_m | \theta, \phi, y, z)].$$

21. The method of claim 20 wherein the number of said planes is k. and the same number of equations N are produced where $$N = k(k-1)/2,$$

With which five RPG parameters $\{\theta, \phi, y, z, V\}$ can be estimated.

22. The method of claim 21 wherein said object's estimated impact point is $$\hat{s} = \begin{pmatrix} 0 \\ \hat{y} \\ \hat{z} \end{pmatrix}.$$

23. The method of claim 22 wherein said object's impact time is $$\hat{T}_{impact} = T_n + \hat{V}^{-1} [\hat{s} - r(\vec{n}_n, \vec{p}_n | \hat{\theta}, \hat{\phi}, \hat{y}, \hat{z})].$$

* * * * *